UNITED STATES PATENT OFFICE.

FRANKLIN SILAS LAMSON, OF WASHINGTON, DISTRICT OF COLUMBIA, ASSIGNOR TO COSMOS CONSTRUCTION COMPANY, OF WASHINGTON, DISTRICT OF COLUMBIA, A CORPORATION OF THE DISTRICT OF COLUMBIA.

PROCESS FOR MAKING ARTIFICIAL STONE AND CONCRETE.

No. 870,370.      Specification of Letters Patent.      Patented Nov. 5, 1907.

Application filed August 14, 1902. Serial No. 119,673. Renewed September 21, 1906. Serial No. 335,647.

*To all whom it may concern:*

Be it known that I, FRANKLIN SILAS LAMSON, a citizen of the United States, residing at Washington, District of Columbia, have discovered a new and useful Process of Making Artificial Stone and Concrete, of which the following is a specification.

This discovery relates to the making of artificial stone, and concrete, by the combination of Portland cement, sand or finely crushed stone, and water—whether with or without gravel or crushed stone, and with or without coloring material; and has for its object the production of Portland stone, and Portland concrete, which can be easily and rapidly made by machinery; which will be ready for use in a short period of time; very hard and tough and durable; and capable of use in the various forms of plastic art which require a material that can be molded into desired forms, and then will set and harden into imperishable stone.

In the making of artificial stone and concrete, of the materials above described, I have discovered that when the combination of such materials, in proper proportions and properly worked, is made with the temperature of the materials at about the expansion decreasing temperature of water—39° to 32° F., and the product thus made is kept at about this temperature until the setting of the cement be complete—requiring six or seven hours, more or less, according to the cement used, the product becomes stone, ready to be laid in the wall (or used) in a day's time; becoming in time so hard and tough that granite-working tools make but little impression on it; impervious to water, frost-proof and fire-proof; practically indestructible by ordinary agencies. The combination of such materials at such temperatures also gives sufficient rigidity to the freshly mixed plastic product as to allow it to be forced out of the mixing machine, through openings of desired form, in a compressed continuous mass which retains its form, upon molds, plates or conveyers; to be cut to desired lengths by wires, or other cutting devices; to be pressed in molds to desired forms; and to be "conveyed" to places of deposit without injury. As a result of this quality of rigidity in the plastic mass, therefore, opportunity is given to use machines whereby great rapidity and accuracy are obtainable in the production of such stone and concrete; enabling the rapid construction of buildings—since the stone made in one day at the building site (any desired quantity), can the next day be conveyed to the workmen and laid in the wall; enabling the rapid construction of concrete beds for street pavements—since the product (of regular size), after being forced out of the machine and cut to lengths, can be conveyed directly to the workmen and evenly laid, and rolled while fresh (before the cement sets), thus making the pavement a homogeneous mass of even quality and endurance. At the temperature above named, also, the initial and final settings of the cement are retarded (varying with the brands used), so that ample time is given for the completion of the work described, without injury to the product from premature setting.

In the practical application of the process of producing and emplacing the freshly plastic product in concrete form, the preparation of the foundation bed of a structure should be accurately done, so that the regular thickness of material may produce a surface of regular contour—although any inaccuracies can be corrected by the application of loose material of similar quality and temperature; a layer of heat-non-conducting and water-non-absorbing material should then be laid (to prevent the conduction of heat from the bed to the concrete, and the absorption by the bed of the water in the concrete), upon which material the layer or layers of plastic concrete should be regularly and closely emplaced, and thoroughly compressed. By the use of two or more machines—or by the use of one machine having two or more mixing and compression chambers—two or more layers of differing quality, such as a base and a superstructure, can be emplaced, and by compression be united and compacted before the setting of the cement. After compression, and before the setting of the cement, the surface of a structure can be scored, indented, or otherwise impressed, by the use of properly prepared rollers, or other tools. During the setting period a construction should be inclosed with non-conducting material, to prevent the absorption of heat by the fresh concrete; which concrete should also have added pressure applied thereto during such period.

In the erection of artificial stone or concrete structures this process permits the most rapid, as well as the strongest and most durable, construction. The life of steel constructions, instead of being problematical—with a certainty of ultimate destruction, can be assured against results of corrosion, and thereby be indefinitely extended. With suitable portable machinery within the area of, or adjacent to, the site on which the structure is to be built, the material for the varied parts thereof can be prepared with any degree of rapidity desired, and conveyed to the workmen to be emplaced, or used. In steel-construction structures, the steel frame can be inclosed in—or covered with—cement material (air-proof, fire-proof, water-proof), thus protecting the steel from injury, and making the structures practically indestructible except by earthquakes, etc., "acts of God". In such structures, having a steel framework inclosed, the stone-work of the structures, when "stone" is used, should combine therewith. In inclosing the framework within such stone-work, the stone-work next the steel may be spaced from it, leaving recesses to receive the plastic cement material around the steel, which material, when set and hardened, would bind the stone-work and frame together; every such inclosed portion of a frame should be entirely inclosed in the cement material, which should also be applied to, and entirely cover, every other portion of such frame. In the construction of parts of structures to which such forms would be adapted, metal rods, bars, lath, netting, expanded sheets, etc., may be used in combination with the stone or concrete material.

When it is desired to introduce metal strengthening material in connection with the fresh material for the stone or concrete, the production of the material in forms of regular thickness enables the quick and regular introduction of such strengthening material between the sections, or layers, when the described compression will unite and compact the mass, and form the strengthened product desired. In introducing such strengthening material between the sections of plastic material for "stone", the compressing and freezing room pressure would unite the plastic sections with the included metal; in introducing such material between layers for floors, walks, pavements, etc., the ordinary roller pressure would unite them; and in introducing such material between layers placed in wall-molds, the usual ramming would serve the same purpose.

In producing the temperature contemplated by this process no special method is required, as any well-known method—such as air-compression or gas-expansion—may be used without affecting the process in other than an economical way. The production of such temperature for such purpose, should—as far as practicable—be accomplished within such inclosure as will permit its regulation and continuance within the limits, as in the ordinary use of the process the material is mixed at a temperature of about 39° F., and the temperature caused to descend to 32° F., or lower, and caused to be kept at about such degree until the setting of the cement is complete.

The process herein described and claimed is not limited to the specific degrees of temperature noted, as still lower temperature may be of service, nor to any special order, or degree of rapidity, in the production of the water-expansion temperature intended to be obtained, one object in view being the production of pressure by the expansive force exerted thereby. In the application of the pressure obtained by the expansive force of freezing water to the inchoate stone "pressed in molds", (see above), such pressed material is held locked in such molds during the period of freezing. The "increased pressure", claim 8, to be given to the concrete after it has been "rolled while fresh" (see above) may be produced by having it heavily loaded during the period of the initial and final setting of the cement.

The sequences, or steps, in this process are: mixing the material at the described temperature; by pressure giving the material concrete form; depositing it on molds, plates or conveyers; separating it into sections; conveying the sections to places of deposit—the stone to the compressing and freezing room, the concrete to the pavement-bed; placing the stone sections (in molds) in the compressor and compressing them (locking down the mold-covers), the concrete sections in layers on the bed and compressing them by rollers; the stone sections (in locked molds) are then placed in the freezing room until the cement has set, the rolled pavement is heavily loaded during the setting period—when desired the rolled pavement may also be frozen, naturally or artificially.

Since reference has herein been necessarily made to certain machinery and appliances which cannot—under the rules—be included in this application, note is here made of the intention to include such subject-matter in other application, or applications, to be hereafter perfected and made.

I am aware that it was known prior to my application that the making of concrete in cold weather "has an advantageous result", that result being due to the fact that in such weather the water is not evaporated from the mixture before the cement sets, as in hot weather, "mild damp weather" being considered better than either; but I am not aware that it was known (and such knowledge utilized) that the stiff plasticity produced by the temperature of the materials between 39° and 32° F., enabled the production of the stone and concrete, by mechanical means, in concrete forms of regular size, as herein set forth. I am also aware that the material for concrete has been mixed by machines, that such mixed material has been received in barrows and other receptacles and conveyed to places of deposit; all of which can be done at ordinary temperatures, whether the so-called "dry process" or "wet process" be used, as no particular degree of rigidity is required to enable such operations; but when the object is to produce in such mixtures a plasticity stiff enough to enable the product to be operated upon by machines, as herein described, such object can not be accomplished at ordinary temperatures, the particular temperatures necessary being those commonly avoided in the art from fear of the freezing which I have found to be so valuable.

What I claim, and desire to secure by Letters Patent, is—

1. The process of making Portland stone or concrete, consisting in mixing the materials (cement, sand, water, etc.) with their temperature between 39° and 32° F., such range enabling the adaptation of temperature to the varying quality of the mixtures, produced by the different proportions of the materials used, whereby stiff plasticity is given to each mixture, substantially as described.

2. The process of making artificial stone or concrete, consisting in mixing the material at about the expansive decreasing-temperature of water—39° to 32° F., and keeping it at about this temperature until the setting of the cement be complete, substantially as described.

3. The process of making artificial stone or concrete, consisting in mixing the material at about the expansive decreasing-temperature of water—39° to 32° F., packing it by ramming or compression, and keeping it at about this temperature until the setting of the cement be complete, substantially as set forth.

4. The process of making artificial stone or concrete, consisting in mixing the material at about the expansive decreasing-temperature of water—39° to 32° F., packing it by ramming or compression, and keeping it under compression at such temperature until the setting of the cement be complete, substantially as described.

5. The process of making artificial stone or concrete, consisting in mixing the material at about 39° F., packing it by ramming or compression, and causing its temperature to descend to 32° F., or lower, before the setting of the cement be complete, substantially as described.

6. The process of making artificial stone or concrete, consisting in mixing the material at about 39° F., packing it by ramming or compression, causing its temperature to descend to 32° F., or lower, before the setting of the cement, and keeping it at such temperature until the setting of the cement be complete, substantially as described.

7. The process of making artificial stone or concrete, consisting in mixing the material at about 39° F., packing it by ramming or compression, and keeping it under compression with the temperature descending to 32° F., or lower, before the setting of the cement be complete, whereby the compression is increased by the expansive force of freezing water during the period of setting, substantially as set forth.

8. In the production of Portland stone or concrete, the material for which has been rammed or compressed before the setting of the cement, a method of adding increased pressure during the period of the setting of the cement, substantially as described.

9. The process of making artificial stone or concrete, consisting in mixing the material at about the expansive decreasing-temperature of water—39° to 32° F., and giving the plastic mass a concrete form, while kept at said temperature, substantially as set forth.

10. The process of making artificial stone or concrete, consisting in mixing the material at about the expansive decreasing-temperature of water—39° to 32° F., giving the plastic mass concrete forms, and emplacing them on, in or with a structure, while kept at said temperature, substantially as set forth.

11. The process of making artificial stone or concrete, consisting in mixing the material at about the expansive decreasing-temperature of water—39° to 32° F., giving the plastic mass concrete forms, emplacing them on, in or with a structure, and applying pressure thereto, while kept at said temperature, substantially as set forth.

12. The process of making artificial stone or concrete, consisting in mixing the material at about the expansive decreasing-temperature of water—39° to 32° F., and giving the plastic mass a concrete form of progressive continuity, while kept at said temperature, substantially as set forth.

13. The process of making artificial stone or concrete, consisting in mixing the materials with their temperature between 39° and 32° F., and giving the stiffly-plastic mass a concrete form of regular size, while kept at such temperature, substantially as set forth.

14. The process of making artificial stone or concrete, consisting in mixing the materials with their temperature between 39° and 32° F., and giving the stiffly-plastic mass a concrete form of regular size and progressive continuity, while kept at such temperature, substantially as set forth.

15. The process of making artificial stone or concrete, consisting in mixing the materials with their temperature between 39° and 32° F., and giving the stiffly-plastic mass a concrete form of regular thickness, while kept at such temperature, substantially as set forth.

16. The process of making artificial stone or concrete, consisting in mixing the materials with their temperature between 39° and 32° F., and giving the stiffly-plastic mass a concrete form of regular thickness and progressive continuity, while kept at such temperature, substantially as described.

17. The process of making Portland stone or concrete which consists in mixing the material with its temperature at about 39° to 32° F., and giving the plastic mass concrete form.

18. The process of making Portland stone or concrete which consists in mixing the material with its temperature at about 39° to 32° F., and giving the plastic mass concrete forms of regular size.

19. The process of making Portland stone or concrete which consists in mixing the material with its temperature at about 39° to 32° F., and giving the plastic mass concrete forms of regular thickness.

20. The process of making Portland stone or concrete which consists in mixing the material with its temperature at about 39° to 32° F., and giving the plastic mass concrete forms of progressive continuity.

21. The process of Portland concrete construction which consists in mixing the material with its temperature at about 39° to 32° F., giving the plastic mass concrete forms, and emplacing them in a structure while fresh.

22. The process of Portland concrete construction which consists in mixing the material with its temperature at about 39° to 32° F., giving the plastic mass concrete forms, emplacing them in a structure while fresh, and applying pressure thereto.

23. The process of Portland concrete construction which consists in mixing the material with its temperature at about 39° to 32° F., giving the plastic mass concrete forms, and emplacing them in a structure while fresh in a plurality of forms or layers, whereby formations of varying quality or form may be conjointly laid, ready for compression.

24. The process of Portland concrete construction which consists in mixing the material with its temperature at about 39° to 32° F., giving the plastic mass concrete forms of regular size, emplacing them while fresh upon a prepared foundation, and by pressure bringing them to desired figure or contour while still fresh.

25. The process of Portland concrete construction which consists in mixing the material with its temperature at about 39° to 32° F., giving the plastic mass concrete forms of regular size, emplacing them while fresh upon a prepared foundation, by pressure bringing them to desired figure or contour while still fresh, and covering or inclosing the pressed construction with non-conducting material while the cement sets.

26. The process of Portland concrete construction which consists in mixing the material with its temperature at about 39° to 32° F., giving the plastic mass concrete forms of desired size and figure, emplacing them while fresh in desired position, by pressure bringing them to correct figure or contour while still fresh, and subsequently applying to the compressed construction additional pressure while the cement sets.

27. The process of making Portland stone or concrete, consisting in mixing the materials with their temperature between 39° and 32° F., giving the stiffly-plastic mass a concrete form of regular size, and depositing it on molds, plates or conveyers, while kept at such temperature, substantially as described.

28. The process of making Portland stone or concrete, consisting in mixing the materials with their temperature between 39° and 32° F., giving the stiffly-plastic mass a concrete form of regular size and progressive continuity, and depositing it on molds, plates or conveyers, while kept at such temperature, substantially as described.

29. The process of making Portland stone or concrete, consisting in mixing the materials with their temperature between 39° and 32° F., giving the stiffly-plastic mass a concrete form of regular size and progressive continuity, depositing it on molds, plates or conveyers, and cutting or separating it into regular sections of any desired size and form, while kept at such temperature, substantially as set forth.

30. The process of making Portland stone or concrete, consisting in mixing the materials with their temperature between 39° and 32° F., giving the stiffly-plastic mass a concrete form of regular size and progressive continuity, depositing it on molds, plates or conveyers, cutting or separating it into regular sections of any desired size and form, and conveying it to places of deposit, while kept at such temperature, substantially as described.

31. The process of making Portland stone or concrete, consisting in mixing the materials with their temperature between 39° and 32° F., giving the stiffly-plastic mass a concrete form of regular size and progressive continuity, depositing it on molds, plates or conveyers, cutting or separating it into regular sections of any desired size and form, conveying it to places of deposit and depositing it, while kept at such temperature, substantially as described.

32. The process of making Portland stone or concrete, consisting in mixing the materials with their temperature between 39° and 32° F., giving the stiffly-plastic mass a concrete form of regular size and progressive continuity, depositing it on molds, plates or conveyers, cutting or separating it into regular sections of any desired size and form, conveying it to places of deposit, and compressing it, while kept at such temperature, substantially as described.

33. The process of making artificial stone or concrete, consisting in mixing the material at about the expansive decreasing-temperature of water—39° to 32° F., giving the plastic mass a concrete form of progressive continuity, depositing it on molds, plates or conveyers, cutting or separating it into sections, conveying it to places of deposit, compressing it, and keeping it under compression at said temperature until the setting of the cement be complete, substantially as set forth.

34. The process of concrete construction which consists in mixing the material to stiff plasticity, thereby enabling the use of operative machines for giving such-material concrete form, substantially as described.

35. The process of concrete construction which consists in mixing the material to stiff plasticity, and giving the plastic mass concrete form.

36. The process of concrete construction which consists in mixing the material to stiff plasticity, and giving the plastic mass concrete forms of regular size.

37. The process of concrete construction which consists in mixing the material to stiff plasticity, and giving the plastic mass concrete forms of regular thickness.

38. The process of concrete construction which consists in mixing the material to stiff plasticity, and giving the plastic mass concrete forms of progressive continuity.

39. The process of concrete construction which consists in mixing the material to stiff plasticity, giving the plastic mass concrete forms, and emplacing them in a structure while fresh.

40. The process of concrete construction which consists in mixing the material to stiff plasticity, giving the plastic mass concrete forms, emplacing them in a structure while fresh, and applying pressure thereto.

41. The process of concrete construction which consists in mixing the material to stiff plasticity, giving the plastic mass concrete forms, and emplacing them in a structure while fresh in a plurality of forms or layers, whereby formations of varying quality or form may be conjointly placed, ready for jointure or compaction.

42. The process of concrete construction which consists in mixing the material to stiff plasticity and giving the plastic mass regular form, substantially as described.

43. The process of concrete construction which consists in mixing the material to stiff plasticity, giving the plastic mass regular form, and emplacing it while fresh on, in or with a structure.

44. The process of concrete construction which consists in mixing the material to stiff plasticity, giving the plastic mass regular form, emplacing it while fresh on, in or with a structure, and applying pressure thereto.

45. The process of Portland concrete construction which consists in mixing the material to stiff plasticity, giving the plastic mass regular form, and emplacing it while fresh on, in or with a structure.

46. The process of Portland concrete construction which consists in mixing the material to stiff plasticity, giving the plastic mass regular form, emplacing it while fresh on, in or with a structure, and applying pressure thereto.

47. In a process for making concrete structures, the step of emplacing the freshly plastic material in concrete forms.

48. In a process for making concrete structures, the step of emplacing the freshly plastic material in concrete forms of desired shape, thickness or size.

49. In a process for making concrete structures, the steps of emplacing the freshly plastic material in concrete forms of desired shape, thickness or size, and applying pressure to unite or compact them.

50. In a process for making concrete structures, the step of emplacing freshly plastic material of concrete forms in a plurality of forms or layers, whereby formations of varying quality or form may be conjointly placed, ready for union or compaction by pressure applied.

51. In a process for making concrete structures, the step of emplacing the freshly plastic concrete in a layer or layers of regular thickness, substantially as described.

52. In a process for making concrete structures, the step of emplacing the freshly plastic concrete in blocks, or sections, of regular size, whereby such material can be quickly and regularly emplaced.

53. In a process for making concrete structures, the step of placing plastic concrete blocks in formations which break joints laterally or vertically, whereby pressure may most thoroughly unite and compact them into a monolithic mass of formed stone.

54. In a process for making concrete structures, the step of emplacing plastic concrete in regular forms.

55. In a process for making concrete structures, the steps of emplacing plastic concrete in regular forms, and applying pressure to unite them.

56. In a process for making concrete structures which consists in emplacing the freshly plastic material in regular forms, the method of correcting inaccuracies by the application of loose material of adapted quality and temperature.

57. In a process for making concrete structures, the step of interposing non-conducting and non-absorbing material between the plastic concrete surface and an exterior heat-conducting and water-absorbing medium, whereby the desired temperature and moisture of the concrete may be retained while the cement sets.

58. In a process for making concrete structures, the step of interposing non-conducting material between the plastic concrete and an exterior heat-conducting medium, substantially as described.

59. In a process for making concrete structures, the step of emplacing plastic concrete of regular form in a plurality of layers, whereby layers of varying quality may be conjointly laid, ready for compaction by pressure applied.

60. In a process for making concrete structures which consists in the emplacing of the freshly plastic material in regular forms, the method of introducing metal strengthening material between such regular forms of plastic material.

61. In a process for making concrete structures which consists in the emplacing of the freshly plastic material in regular forms, the method of introducing metal strengthening material between such regular forms of plastic material, and applying pressure thereto.

62. In a process for making concrete structures which consists in the emplacing of the freshly plastic material in forms of regular thickness, the method of correcting inaccuracies by the application of loose material of adapted quality and temperature, substantially as described.

63. In a process for making Portland stone and steel-frame constructions, substantially as described, the method of uniting such stone and such frame by connecting them with freshly plastic cement material, whereby such stone and frame combine to carry the load, and the plastic cement material, when set, protects the steel from corrosion.

In testimony whereof I have signed my name to this specification in the presence of two subscribing witnesses.

FRANKLIN SILAS LAMSON.

Witnesses:
E. H. LAMSON,
C. T. LAMSON.